United States Patent [19]

Blokker, Jr. et al.

[11] Patent Number: 4,811,407

[45] Date of Patent: Mar. 7, 1989

[54] METHOD AND APPARATUS FOR CONVERTING ANALOG VIDEO CHARACTER SIGNALS INTO COMPUTER RECOGNIZABLE BINARY DATA

[75] Inventors: Johan F. Blokker, Jr.; Eric B. Randall, both of Fairfield, Iowa

[73] Assignee: CableSoft, Inc., Fairfield, Iowa

[21] Appl. No.: 821,283

[22] Filed: Jan. 22, 1986

[51] Int. Cl.[4] ............................................. G06K 9/00
[52] U.S. Cl. .......................................... 382/1; 382/56; 358/142; 358/903
[58] Field of Search ................ 364/200, 900; 358/85, 358/13, 142, 263, 282, 903; 382/1, 9, 10, 18, 30, 33, 34, 48, 51, 52, 56

[56] References Cited

U.S. PATENT DOCUMENTS

| | | | |
|---|---|---|---|
| 3,165,718 | 1/1965 | Fleisher | 382/18 |
| 3,492,646 | 1/1970 | Bene et al. | 340/146.3 |
| 3,643,823 | 1/1972 | Dietrich | 340/146.3 Y |
| 3,868,635 | 2/1975 | Shah et al. | 340/146.3 MA |
| 3,891,792 | 6/1975 | Kimura | 358/142 |
| 3,930,231 | 12/1975 | Henrichon, Jr. et al. | 382/30 |
| 3,965,290 | 6/1976 | Tisue | 178/6 |
| 3,993,861 | 11/1976 | Baer | 178/5.6 |
| 4,040,009 | 8/1977 | Kadota et al. | 340/146.3 AQ |
| 4,095,259 | 6/1978 | Sawagata | 358/141 |
| 4,122,299 | 10/1978 | Cannon | 178/26 A |
| 4,135,231 | 1/1979 | Wintfeld et al. | 358/263 |
| 4,148,070 | 4/1979 | Taylor | 358/160 |
| 4,208,652 | 6/1980 | Marshall | 340/146.3 Y |
| 4,365,234 | 12/1982 | Henrichon, Jr. | 382/9 |
| 4,420,833 | 12/1983 | Noirel | 370/83 |
| 4,490,851 | 12/1984 | Gerhart et al. | 382/143 |
| 4,497,066 | 1/1985 | Gasparri, Jr. | 382/48 |
| 4,517,597 | 5/1985 | Glenn | 358/141 |
| 4,521,909 | 6/1985 | Wang | 382/38 |
| 4,536,791 | 8/1985 | Campbell et al. | 358/263 |
| 4,567,609 | 1/1986 | Metcalf | 382/34 |
| 4,599,611 | 7/1986 | Bowker et al. | 358/903 |
| 4,646,134 | 2/1987 | Komatsu et al. | 358/263 |

OTHER PUBLICATIONS

Fu Publication.
Yamashita Publication.
Handbook of Artificial Intelligence.
Kimpan Article, C4, Edge Detection and Line Finding.

*Primary Examiner*—Leo H. Boudreau
*Assistant Examiner*—Jose L. Couso
*Attorney, Agent, or Firm*—Bell, Seltzer, Park & Gibson

[57] ABSTRACT

A method and apparatus for converting a conventional analog video signal carrying alphanumeric video characters into computer recognizable data is disclosed. A signal containing composite video information is received and is decoded into component signals comprising the analog video signal, the horizontal sync component and the vertical sync component. The analog video component signal is converted into binary matrix data representing the received signal carrying alphanumeric video characters. The binary matrix data is compared with binary data representing a known character reference set to determine the character data code for the particular unknown character and uniquely identifying the same and retrieving its unique data code. The character once identified may be sent to a host computer for further processing if desired.

32 Claims, 3 Drawing Sheets

2222299992222200  00
                  ROW
  COLUMN TOTAL    TOTAL
```

Fig-6

```
       ARCHETYPE              DATA               ERRORS
 -------------------    -------------------    -------------------
 00000000 00000000      00000000 00000000      00000000 00000000
 00000000 00000000      00001000 00000000      00001000 00000000
 11111111 11111100      11111111 11111100      00000000 00000000
 11111111 11111100      11111111 11111100      00000000 00000000
 00000111 10000000      00000111 10000000      00000000 00000000
 00000111 10000000      00000111 11000000      00000000 01000000
 00000111 10000000      00000011 10000000      00000100 00000000
 00000111 10000000      00000111 11000000      00000000 01000000
 00000111 10000000      00000111 10000000      00000000 00000000
 00000111 10000000      00000111 10000000      00000000 00000000
 00000111 10000000      00000111 10000000      00000000 00000000
 00000000 00000000      00000000 00000000      00000000 00000000
 00000000 00000000      00000000 00000000      00000000 00000000
 00000000 00000000      00000000 00000000      00000000 00000000
 00000000 00000000      00000000 00000000      00000000 00000000
```

Fig-7a    Fig-7b    Fig-7c

```
                                            DATA IN THIS
BIT PATTERN OF INTEREST    TABLE ADDRESS       LOCATION
-----------------------    ----------------   -----------
       01100011            XXXXXXX 01100011       04
       10111100            XXXXXXX 10111100       05
       10000000            XXXXXXX 10000000       01
```

Fig-8

METHOD AND APPARATUS FOR CONVERTING ANALOG VIDEO CHARACTER SIGNALS INTO COMPUTER RECOGNIZABLE BINARY DATA

FIELD OF THE INVENTION

This invention relates generally to the field of data conversion devices and more particularly to the field of translating analog video character signals into computer recognizable binary data.

BACKGROUND AND SUMMARY OF THE INVENTION

Conventional television sets are being used with ever increasing frequency as a means for communicating audio and video information to the viewer. The video information may be graphical, such as a scene, chart or design, or it may be alphanumeric characters, such as numbers, letters or symbols that together convey a written message. Such alphanumeric information may take the form of news emergency warnings issued by the National Weather Service of inclement weather, or notification by the local education authorities of school closings due to snow or other causes. In addition, written news broadcasts, scores of sporting events, and stock market information are commonly transmitted via broadcast television signals or equivalent closed circuit cable transmissions.

In the present state of the art, applicants are unaware of any means by which the information contained in a conventional analog video signal may be readily converted to a binary signal for use by a computer. This would be advantageous in situations as the above described since the computer, once having information of an approaching thunderstorm for example, could automatically disconnect household appliances, such as air conditioners, which are particularly susceptible to damage during thunderstorms. The present apparatus could also be used to monitor school closings and could regulate household activities accordingly. In addition, handicapped persons, such as the blind, could benefit by the conversion of alphanumeric data transmitted over the television into a computer recognizable code which could then be output to a voice synthesizer. A further use of the invention would be in the case of an individual having a personal computer at home to update his stock market portfolio directly from the stock quotes on the television.

Although the methods and apparatus for receiving television signals, whether by broadcast or close circuit transmission, and converting them into images on the television screen are old and well known in the art, a basic understanding of the operation of a conventional television receiver is helpful. A television operates by rapidly generating a series of lines across the face of the television tube in a sequence similar to a typewriter generating lines across the face of a page. The lines are generated by scanning an electron beam across the phosphorous surface of a television tube. Each scanned line must start at a definite time and location after the preceding line to trace the scene in precisely the same manner in which the scene was originally viewed by the television camera or other signal source. Otherwise, the various lines might be skewed or out of synchronism, resulting in a badly distorted or incomprehensible picture. To ensure accurate synchronization between the television camera and receiver, synchronizing pulses are transmitted as a part of the signal.

Synchronizing and scanning circuits in the television respond to the incoming analog video signal to produce sweep signals that are applied to the picture tube by plates or coils to sweep the electron beam across the screen. The electron beam sweeps relatively slowly as it excites the fluorescent spots on the face of the picture tube to generate an image, and returns rapidly to repeat the tracing. The sweeping action and location of the electron beam are controlled by the synchronizing pulses, namely, vertical synchronizing pulses and horizontal synchronizing pulses, and the intensity of the fluorescent spots is controlled by the video signal to correspond to the intensity of the original scene. The horizontal sync pulses initiate the retracing of the beam at the end of each line and the vertical synchronizing pulses initiate the retracing of the beam at the end of each picture field to return it to the top of the screen. The video signal, horizontal sync signal, and vertical sync signal are broadcast as an analog, amplitude modulated composite signal that may be separated or decoded into its individual components.

While method and apparatus are known for converting analog signals into digital signals, the difficulty lies in generating binary data that is accurately synchronized to correspond to the synchronization of the analog signal that generates each scene on the television picture tube.

In view of the foregoing, it is an object of the present invention to provide method and apparatus for converting a conventional analog video signal carrying alphanumeric video characters into computer recognizable binary data that may be processed further as desired by a computer.

It is a further object of the present invention to provide a method and apparatus for converting a standard television analog video signal containing alphanumeric video characters into computer recognizable binary data.

It is a further object of the present invention to provide a method and apparatus for converting the analog video component of a standard television analog signal into a corresponding stream of binary data bits.

These and other objects are accomplished by generally providing a method and apparatus for converting a conventional analog video signal carrying alphanumeric video characters into computer recognizable binary data. A signal is received containing composite video information. The received signal is decoded into component signals comprising the analog video component signal, the horizontal sync component signal and the vertical sync component signal. The analog video component signal is converted into binary matrix data representing the received signal carrying alphanumeric video characters. The binary matrix data is compared with binary data representing a known character reference set to determine the character data code for the particular unknown character and uniquely identifying the same and retrieving its unique data code. The character, once identified, can be sent to a host computer for further processing as desired.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
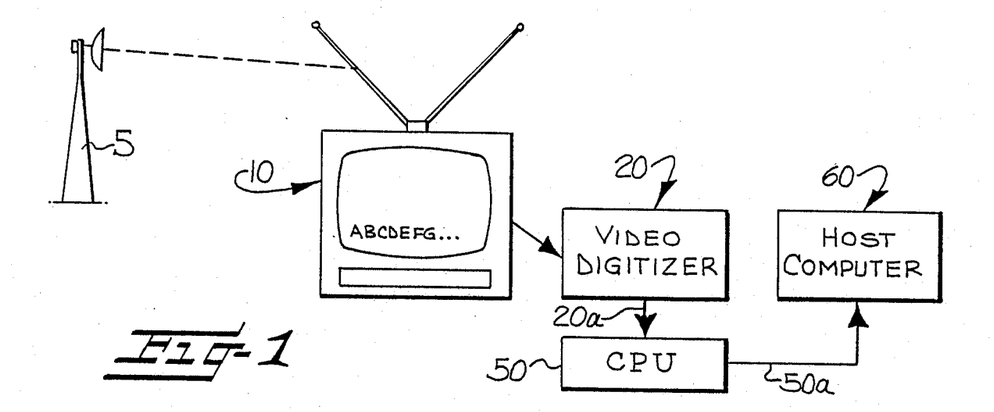
FIG. 1 is a schematic diagram of the invention showing a television receiving an analog signal carrying alphanumeric video characters and converting the same into computer recognizable binary data.

In FIG. 1, a television receivable signal containing analog composite video information is transmitted via an antenna 5 or other suitable means such as a closed circuit cable (not shown) to a conventional receiver 10, such as a television. The circuitry of the television decodes the received composite signal into its analog video component signal, its horizontal sync component signal and its vertical sync component signal as will be disclosed in greater detail hereinbelow. The analog video signal and the sync signals are output from the television on line 10a to a video digitizer means generally indicated at 20. From these signals the video digitizer identifies the portion of the transmitted video image frame containing alphanumeric information data and converts it into binary (or digital) matrix data which is output on line 20a to a computer or central processing unit (CPU) 50. The CPU compares the binary matrix data with data representing a known character reference set and identifies the computer recognizable code which corresponds to the character under examination. Once the character has been uniquely identified, its code is output from CPU 50 on line 50a to, for example, a host computer 60 for further processing as desired.

Figure 2:
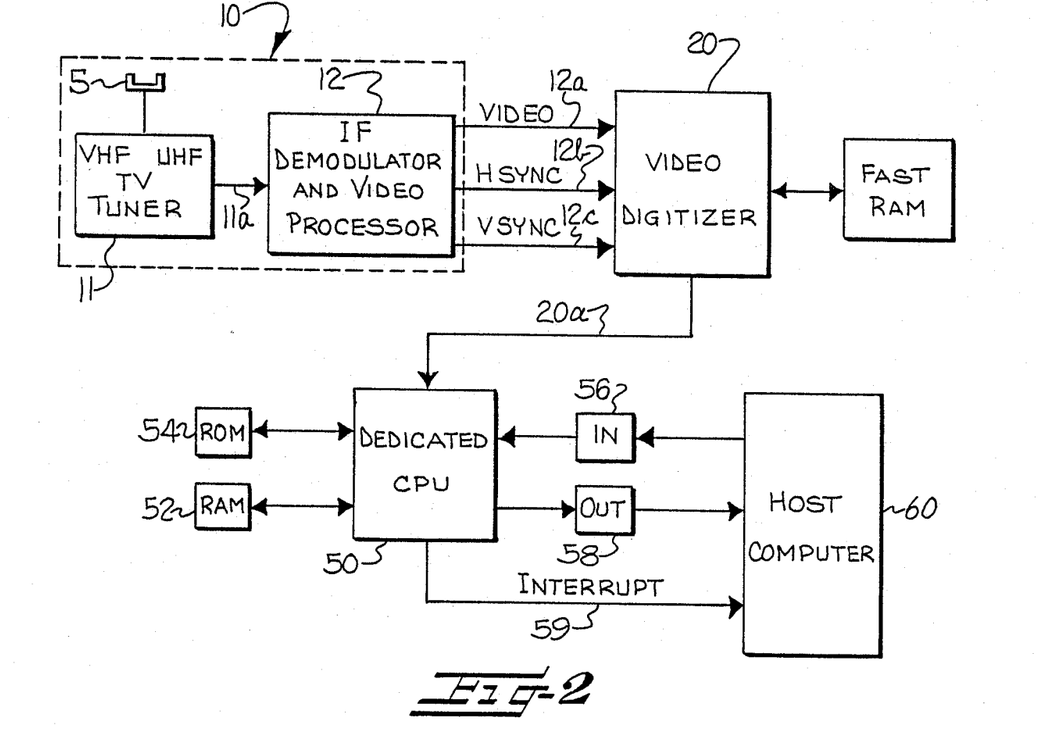
FIG. 2 is a schematic diagram of the apparatus of the present invention used to convert the analog video signal into computer recognizable binary data.

Referring now to FIG. 2, the analog video signal that contains the alphanumeric characters is typically received by an antenna 5 or is input directly into a television if the input is via a closed circuit or master antenna cable system. Although this disclosure relates to a standard broadcast television receiver, other means for receiving radio frequency encoded signals may be used, as well as other means for receiving composite video signals. The input signal level may range from about 40 dBmV to −20 dBmV.

Video information is generally transmitted at a high frequency (channels 2–6 at 54 MHz to 88 MHz; channels 7–13 at 177 MHz to 216 MHz; and channels 14–83 at 473 MHz to 887 MHz) and it is this signal which the television receives. A tuner 11 converts the video signal to be analyzed to a lower or an intermediate frequency (the video intermediate frequency in the United States is 45.75 MHz). The tuner 11 is a standard component in all consumer television receivers and is well known to those skilled in the art.

The intermediate frequency signal is output from the tuner 11 on line 11a to an intermediate frequency demodulator and video processor unit 12 which decodes the received signal into a composite analog video signal, a vertical sync component signal (V sync), and a horizontal sync component signal (H sync). These signals must be noise and jitter free so that an accurate digitization of the video signal can take place in the next stage of the apparatus. The present preferred embodiment of invention employs a Motorola MC 13001P microprocessor chip which contains an entire television subsystem. This chip demodulates the intermediate frequency signal on line 11a into a composite video signal while also creating accurate horizontal and vertical sync component signals pulses which are output on lines 12a, 12b, and 12c, respectively.

Up until this point, all the components heretofore discussed have been standard components in television sets. The technology for manufacturing these components has existed for many years, and as such it is unnecessary to describe the aforementioned components in detail since they are well known to those skilled in the art.

Figure 3:
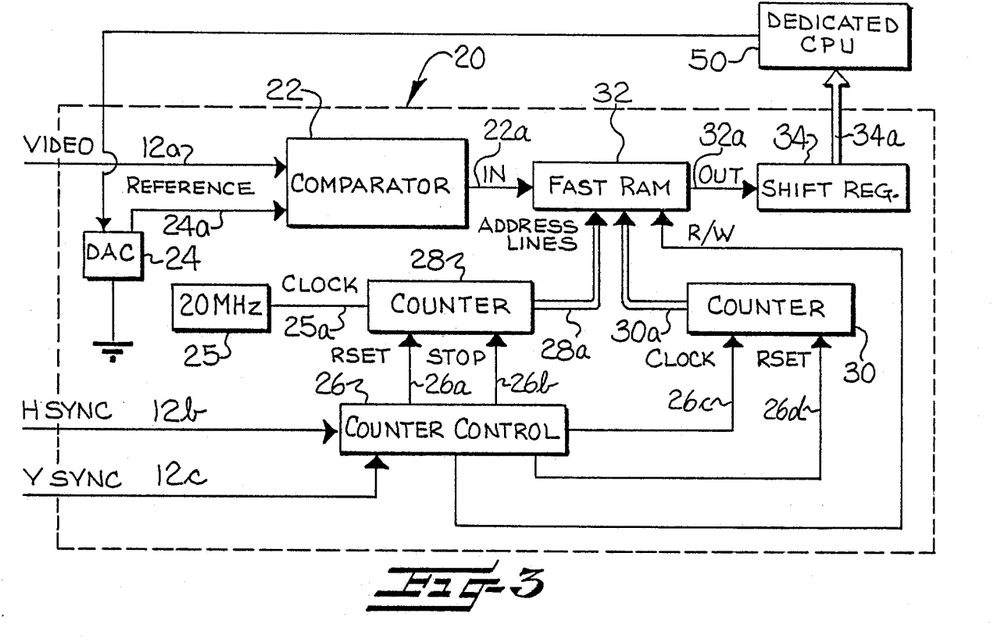
FIG. 3 is a schematic diagram showing the components of the video digitizer shown in FIG. 2.

Referring to FIGS. 2 and 3, the video digitizer means 20 converts each picture element (pel) in the lines of demodulated analog video signals into corresponding streams of binary data bits according to the intensity of each pel of the incoming line of the video signal. The video digitizer means 20 receives as its inputs the analog video signal, the horizontal sync component signal and the vertical sync component signal on lines 12a, 12b, and 12c, respectively. The video signal on line 12a is input into a high speed comparator 22, such as a Signetics LM319. The comparator receives as a second input, a reference voltage in the form of a preset reference voltage generated by a suitable source on line 24a. More specifically, a digital to analog converter DAC 24, such as a National Semiconductor DAC1008 is controlled by dedicated CPU 50 (such as an Intel Z80B micro computer) to produce the reference voltage on line 24a. This allows the program in the ROM to adjust the reference voltage level whenever the voltage level of the composite video drifts up or down due to changes in signal strength or temperature. The comparator 22 compares each pel with the reference voltage and converts the analog video signal into binary data according to the intensity level of each pel (i.e. whether it is above or below the preset reference voltage). The streams of binary data are output from the comparator 22 on line 22a and are stored in fast random access memory (RAM) 32 by reading each line of binary data into successive memory locations in the same timed sequence that each analog video signal is transmitted. The timed operation of the RAM 32 is described later.

The video digitizer 20 is illustrated in more detail in FIG. 3. Using the horizontal and vertical sync signals on lines 12b, 12c, it converts the successive lines of analog video signal into a digitized binary matrix representing at least a portion of the video frame. A video frame is comprised of a series of adjacent, parallel horizontal lines, and each line is comprised of a number of adjacent picture elements in the form of dots having varying brightness or color. Thus, to maintain the vertical and horizontal integrity of the alphanumeric characters in the video frame, each sequential line of video that comprises the alphanumeric characters is digitized and stored in sequence as it is received, with the proper position of each data bit determined by the horizontal and vertical sync signals.

Counter control unit 26 responds to the horizontal and vertical sync signals from the intermediate frequency demodulator and video processor unit 12 to control the operation of the counters 28 and 30, which provide the horizontal and vertical addresses, respectively, for the data to be stored in fast RAM 32. The vertical sync signal ("v sync") on line 12c indicates the beginning of each successive new frame of video and the horizontal sync ("h sync") signal on line 12b indicates the beginning of each successive line of video within a frame. In response to a vertical sync pulse on line 12c, counter control unit 26 outputs reset signals on lines 26a, 26d to initialize counters 28, 30.

After receiving a vertical sync pulse, the counter control counts each horizontal sync pulse within the video frame and compares it to a predetermined count which signifies the desired horizontal line of the video display that is to be digitized, assuming that less than the entire frame is to be digitized. Different areas may be digitized by changing this predetermined number. When the proper horizontal line is reached and the horizontal sync pulse for that line ends, counter 28 is enabled by the counter control unit 26 and counts in response to the pulses from clock 25. The output signals from counter 28 appear on address lines 28a to provide horizontal address signals to fast RAM 32.

The counter control unit 26 also responds to each of the horizontal sync pulses on line 12b by providing a clock signal to counter 30. Counter 30 is thus ultimately incremented in response to each new horizontal sync signal and supplies as an output signal the y-axis address for fast RAM 32 on address line 30a. The adjust the horizontal location of the area of the video image that is to be digitized, the horizontal sync pulse may be lengthened.

In operation, the counter control senses the start of a new frame with the receipt of a vertical sync signal on line 12c. The succeeding horizontal sync singals on line 12b will be counted until the proper line of video has been reached. When the desired horizontal line of video has been reached, counter 28 is enabled, counting in response to the clock signals on line 25a. The output signals from counter 28 on line 28a identify successive horizontal address locations in fast RAM 32. The binary signal from comparator 22 on line 22a is read into fast RAM 32 and placed at each of these successive locations. Thus, each line of video has a vertical address as determined by counter 30, and counter 28 defines successive horizontal positions across each line. Counter 30 advances with the horizontal sync pulses to identify a vertical address location in fast RAM 32 for each line of video. This provides a unique address location in fast RAM 32 for each of the adjacent picture elements comprising the analog video signal, and maintains the integrity of the video signal so that the analog video image that would otherwise appear on a video screen is now accurately represented digitally in the fast RAM.

When the end of a horizontal line is reached, counter control unit 26 resets counter 28 with a signal on line 26a in anticipation of receiving another horizontal sync signal for the succeeding video signal. Similarly, once counter 30 has reached a maximum value, it is reset by the next vertical sync pulse to appear on line 12c. In this manner, each frame of the video signal is accurately digitized. The degree of horizontal resolution may be changed by changing the frequency of clock 25, and the degree of vertical resolution may be adjusted by doubling or skipping certain ones of the horizontal sync signals for advancing counter 30.

The digitized data stored in fast RAM 32 must then be passed to the dedicated CPU 50 in, for example, eight bit bytes. To accomplish this, the counters 28, 30 are reset on the next vertical sync pulse (the next frame of the video signal). This prepares the counters 28, 30 for addressing the data in fast RAM 32 for transfer to the CPU 50. Counter 28 counts up eight from its starting value and then stops. For each of these eight counts, one bit of data from fast RAM 32 is shifted out of the RAM on line 32a into an eight bit shift register 34 to form a byte for the CPU 50 to read. When counter 28 stops, it waits for the CPU 50 to read the byte in the shift register 34. After this byte has been read, counter 28 starts again, shifts eight more bits out of the fast RAM 32 to form another byte for the CPU 50, and then stops. This process continues until all the data from the fast RAM 32 has been transferred to the CPU 50.

On standard broadcast video signals in the United States, there are sixty frames of data broadcast per second (60 vertical sync pulses per second). Since the illustrated embodiment digitizes and collects the data on one frame only, and then passes the binary data to the CPU 50 on the next frame, it is in effect "reading" the video screen once every 1/30 of a second (every other frame). However, it will be noted that the video screen may be read every frame be doubling the aforedescribed circuitry so that when one half is digitizing video, the other half is sending data to the CPU 50. The counter control circuit 26 contains logic gates (not shown) that control counters 28, 30 making them address the fast RAM 32 correctly for the input of data on line 22a and output of the data on line 32a.

Figure 4:
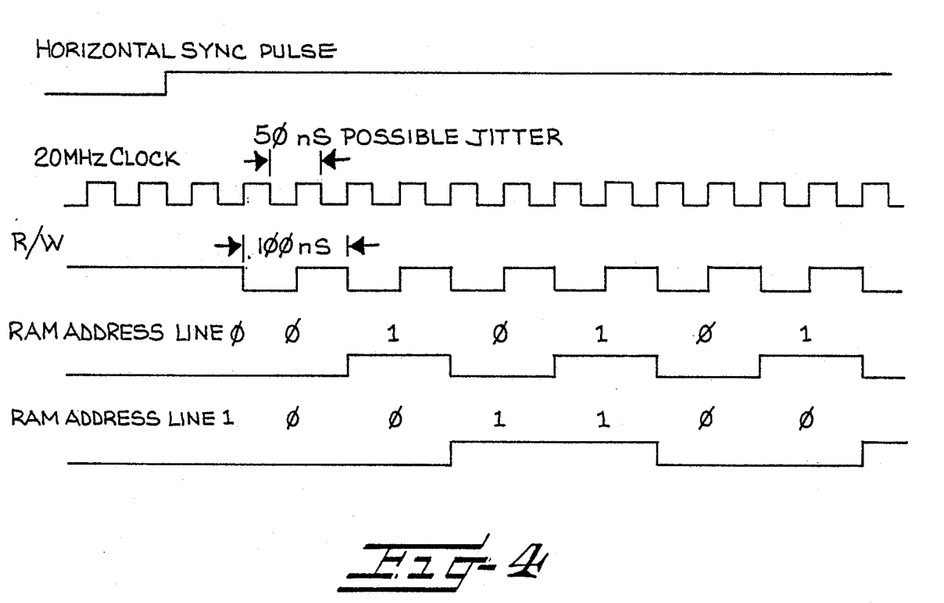
FIG. 4 is a timing diagram showing the frequency and phase relationship between the horizontal sync pulse and the digitizing circuitry.

FIG. 4 shows the frequency and phase relationship between the horizontal sync pulse, the 20 MHz clock 25 that controls counter 28, and the read/write line R/W. The highest frequency output of counter 28 is used to control the read/write R/W line to the fast RAM 32, ensuring that the data is stored at an accurate location in timed sequence with reference to the horizontal sync pulse. The start of the digitization can take place during any part of the clock cycle since the 20 MHz clock is not synchronized to the horizontal sync pulse. This causes a possible jitter of fifty nanoseconds in the time that the read/write line goes to a binary "high" state with respect to the horizontal sync pulse and may cause a 50 nanosecond error in the time of digitization. (The data is stored in the fast RAM 32 when the read/write line is in a binary "low" state.) Since the read/write line is derived from the highest frequency output of counter 28, the rate of digitization is one bit per 100 nanoseconds. In other words, for every two cycles of the clock, one bit of data is stored in fast RAM 32 to effectively digitize the analog video signal.

The remaining outputs of the counters 28, 30 are used as the respective address lines 28a, 30a for the fast RAM 32. On each two cycles of the clock, the RAM address lines, line 28a and 30a are incremented causing the digitized bits to be stored in a sequential order in the fast RAM 32, as illustrated in FIG. 4. The fast RAM 32 used in the video digitizer 20 must accept data faster than the rate at which the lines of video are digitized so that this data can be stored. The present invention uses a memory having a 35 nanosecond write time, such as an Advanced Micro Devices Am2147-35.

The bytes of data representing the digitized character to be identified are output from a shift register 34 on line 34a to the dedicated CPU 50 as described above. The sole purpose of the dedicated CPU 50 is to analyze the digitized video data, to recognize the characters represented by this data, and to then transfer the computer recognizable code (such as ASCII) to a host computer 60 for further processing as desired. The dedicated CPU 50 used in the illustrated embodiment is a Z80B one chip microprocessor. The microprocessor interfaces the RAM 52 and read only memory ROM 54 (FIG. 2) in the typical manner specific to this microprocessor (well known to those skilled in the art). The ROM 54 is where the software program is stored for the operation of the dedicated CPU 50, the major sections of which will be described hereinafter. The RAM 52 is used for storing the digitized video signal passed to the CPU from the video digitizer on line 20a and is also used as a buffer for storing the computer recognizable code of the recognized characters before transmittal of the same to the host computer. The RAM 52 may also be used as a scratch pad for storing variables used by the program stored in ROM 54.

The CPU 50 communicates the computer recognizable code to the host computer 60 through an input port 56, an output port 58 and interrupt line 59. The interrupt line 59 is, in many respects, an output port of the dedicated CPU 50 and is connected to the hardware interrupt handler of the host computer 60. When the dedicated CPU 50 has data to transfer to the host computer 60, it can interrupt the host computer 60 and force it to receive the data from the dedicated CPU 50.

The input line 56 is the hardware used to latch the data from the host computer 60 so that the dedicated CPU 50 can read parameters or get instructions from it. The output line 58 is the hardware used to latch data from the dedicated CPU 50 so that the host computer 60 can read the recognized characters of the video image.

In the present preferred embodiment it is contemplated that the host computer will be of the IBM PC family of computers or other computers compatible with these models. However, it will be noted that any type of computer can be used, as the host computer merely receives the character data and analyzes it for the user as desired.

Figure 5:
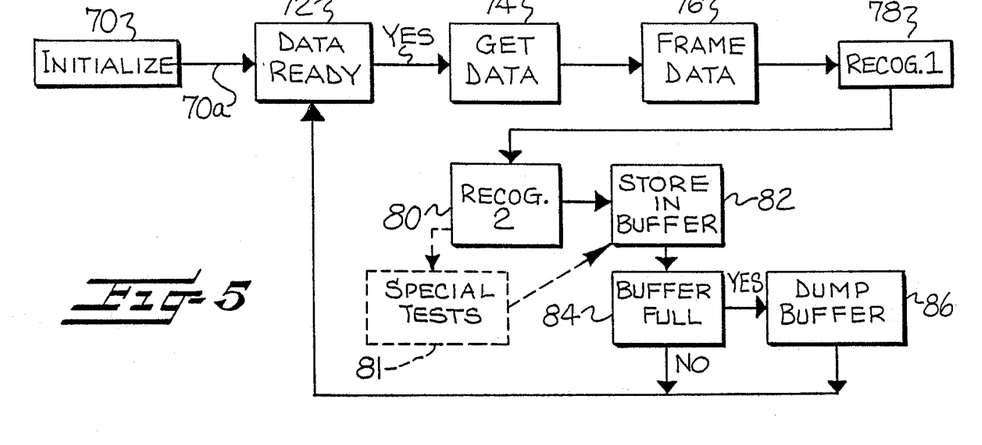
FIG. 5 is a flow chart according to the method of the present invention illustrating the comparison of the binary matrix data to data representing a known character set.

Referring now to FIG. 5 a schematic diagram of the data flow for recognition of the alphanumeric characters according to the method is disclosed. The Initialize routine 70 starts when the power is applied to the dedicated CPU 50 or whenever the CPU 50 is reset. When this section starts it establishes communication between the host computer 60 and the dedicated CPU 50 so that parameters and binary data can be passed between them. This section may also test whether the tuner 11 (FIG. 2) is on the proper channel and whether there are characters on the video image to be analyzed.

The dedicated CPU 50 also monitors the functions of the video digitizers 20 to determine when it is ready to send its digitized video image data to the dedicated CPU 50, as illustrated by the Data Ready? portion of the program. This portion monitors the video digitizer 20, and the shift register 34, for that point in time, waiting for the digitized data to be ready for transfer and for operation of the next section of the data processing method.

When the digitized data is ready, the Get Data routine 74 executes a block move of the data (the entire binary data set stored in matrix form representing the characters to be identified) from the FAST RAM 32 to the dedicated CPU 50. In the present preferred embodiment of the invention 128 byte blocks of data are moved to the CPU 50 during such a block move.

The sequence of characters in the digitized video image that has been passed to the dedicated CPU 50, is segmented to isolate only one character at a time for recognition. The Frame Data routine 76 crops the digitized image to isolate a single character, using a data segmentation algorithm adapted for use with the type of data to be recognized. Data segmentation algorithms are well known and examples may be found in the following publications: Fu, K.S. and Rosenfeld, A., Pattern Recognition and Computer Vision, Computer, October 1984, pp. 274-282; Yamashita, Y., Higuchi K., and Haga, Y., classification of handprinted Kanju characters by structure segment matching method, Pattern Recognition and Letters, July 1983, pp. 475-479; Cohen, Paul R., ed. Feigenbaum, Edward A., ed., The Handbook of Artificial Intelligence, Vol. III, Heuristech Press, Standford, Cal., 1982, pp. 36-45; Kimpan, C., Itoh, A., and Kawanishi, K., Recognition of Printed Thai Characters Using a Matching Method, IEE proceedings, Vol. 130, Pt. E., No. 6, November 1983, pp. 183-188. For example, a different algorithm would be needed to segment a stream of moving characters than would be needed to segment a stationary video image. The segmentation algorithm used in the illustrated embodiment crops the digitized image into the part of the image containing the character to be identified, for example a 16 bit×16 bit matrix. If the alphanumeric characters are moving across the television screen, the Frame Data routine 76 also calculates the number of frames of data to skip until the next character to be identified can be expected to be found in a predetermined window.

Figure 6:
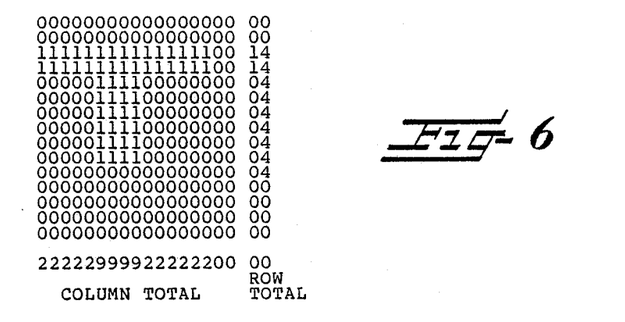
FIG. 6 is a schematic diagram of the binary matrix data representing a character to be identified.

Once the binary character data has been cropped according to the Frame Data routine 76 so that the bit pattern matrix contains a single isolated character, this character is identified. The first step of recognizing an unknown character is designated as Recog 1 and is indicated at block 78. According to the method, the number of binary one bits representing character pels in each of the sixteen rows and sixteen columns of the isolated character in the matrix are counted. In FIG. 6, there is shown an example of the row and column totals for the digitized image of the letter "T". These totals are compared with the row and column totals stored in a character data reference set. If there is a perfect match, then there is a good probability that the digitized data is that character. Yet, in practice, there is rarely a perfect match due to the inherent noise in the digitization process. To deal more effectively with this noise, an exact match is not used; instead, according to the present method, the row totals are stored for each character in the reference set. These reference row totals for each character in the reference set are determined initially by inputting each character into the video digitizer 20 approximately 1000 times and then averaging the number of bits in each row. This reference character data is then stored in memory and is used as the reference set to determine which characters in the reference set best matches the data representing the character to be identified. The row totals of the character data are compared with the row totals of each of the characters of the reference data set. The absolute value of the difference between the row totals of the character data and the row totals of a particular character of the reference set is summed. The ten reference characters with the lowest score (the least number of errors) are used in the next step of the method to further narrow down the possibilities.

Figure 7A:
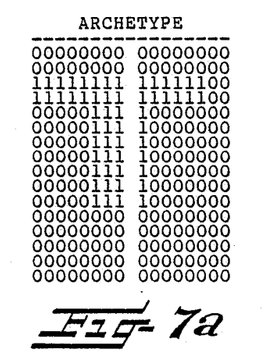
FIGS. 7a-7c illustrate a comparison of the binary matrix data (7b) to data representing a known character set (7a) to identify the number of errors (7c) between the two.
Figure 7B:
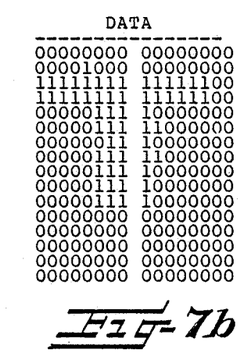
Figure 7C:
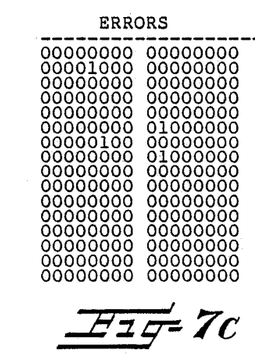

Since Recog 1 only narrows down the possible characters that match the data, further analysis is necessary. This part of the method takes the ten best possible characters from Recog 1 and decides which character is the closest match to the data. To accomplish this with Recog 2, and referring to FIG. 7, the unrecognized data (FIG. 7b) is compared bit-by-bit with a stored archetype (FIG. 7a) of each one of the possible characters as identified in Recog 1. The stored archetypes are found by taking a large number of samples of a single character and adding the number of times a particular bit in the 16×16 bit matrix is set as a binary one or is "high". This number is divided by the number of samples of that character used in the sum to determine if the bit is set high more than 50% of the time. If it is high more than 50% of the time, then that particular bit is set high in the archetype. Using an "exclusive-nor" operation, the CPU compares each byte of sample data to each byte of archetype data. If there are any mismatches between the data and the archetype, they appear in the resulting byte as binary one bits (FIG. 7c). Then, all of the mismatches are summed for each of the characters selected by Recog. 1 in the reference set and the character containing the lowest number of mismatches is selected as the pattern that mostly closely fits the data. The data has been separated into eight bit bytes to represent the method of storage in the dedicated CPU 50, RAM 52, and ROM 54.

This technique has the advantage of narrowing the number of possible matched characters quickly. The present method is faster than other presently employed techniques since the characters are eliminated on the first or second comparison of a row or column total. Only the characters that are very close to a match take up the time needed to look at every pel in each of the rows and columns. Another unique feature of the present invention is that the method for summing these mismatches is accomplished in the shortest possible time.

Figure 8:
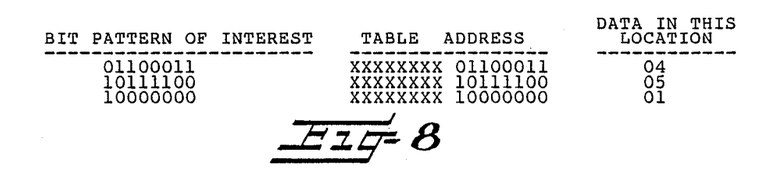
FIG. 8 is a binary representation of the table look-up method used to convert an 8 bit byte into a numeric value corresponding to the number of bits that are 'on' or '1' in the byte.

A slow method for adding the errors, shown for example in FIG. 7c, would be to take each byte and shift it eight times, comparing the value of the carry bit each time. If the carry bit is set, it represents an error. For the above array of data it would take 256 shifts, 256 compares of the carry, and 256 decisions whether or not to increment the error counter. However, according to the present method, a table is created in memory that has stored in it the number of bits that are a binary one for every possible pattern of an eight bit byte. Because there are 256 possible eight bit patterns, the table must be 256 bytes long. The pattern of interest is used as the lower byte of the 16 bit address of the table. The upper byte depends on where the table is located in memory. The number of bits that are "1" in the lower byte of the address is the data stored at that location in the table. To determine the number of bits that are set to one in any eight bit pattern (see FIG. 8), the upper byte of the table address (XXXXXXXX) is used along with the bit pattern of interest as the lower bytes of the address (for example 0110 0011). To find the number of bits set high in the pattern of interest (for example 0110 0011), all that needs to be done is to read the data at this address location. The data stored there is the number of bits that are a binary one in the lower byte of the address (the pattern of interest). To add up all the errors in the array in FIG. 7c, one simply needs to read the location in this table corresponding to the bit pattern of interest 32 times and to sum the values received from the table.

The number of errors is counted from the comparison of the data with each archetype pattern that is a suspected match. Since there might also be a slight left and right shift of the data due to the quantization error of the digitizer, the data is also compared with the archetype after it has been shifted to the right one bit of its original position and left one bit of its original position. The comparison that results in the least number of errors is considered to be the correct character.

The character chosen by Recog 2 is most always the correct choice, therefore, another set of specialized tests may be needed after Recog 2. For example, "Q", "D", and "O" are hard to distinguish from another using the Recog 2 algorithm. If one of these letters is chosen by the Recog 2 algorithm, then specialized tests are used to tell which of these characters the digitized video data represents (Specialized Tests 81 in FIG. 5). An example of a specialized test would be to look for the tail of the "Q" or the lack of corners in the "O". Since these tests are very specialized, they are fast. The maximum accuracy of the recognition method can be optimized using such specialized tests.

Referring to FIG. 5 again, when a character is recognized, it is stored in a RAM buffer 82 (Store in Buf) in computer recognizable code until there are enough recognized characters for a data transfer to take place between the dedicated CPU and the host computer.

The Buffer Full routine 84 tests to see if the buffer is indeed full. If it is full, then the contents of the buffer 82 are passed to the host computer 60 for further processing as desired. On the other hand, if it is not full, then the buffer collects more characters until it is full. At such time as the Dump Buffer routine 86 is activated and passes the data in the buffer to the host computer 60 when the buffer is full.

In the drawings and specification, there has been set forth a preferred embodiment of the invention, and although specific terms are employed they are used in a generic and descriptive sense only and not for purposes of limitation.

That which is claimed is:

1. A method of communicating information via a conventional analog video signal carrying alphanumeric video characters by converting it into computer recognizable binary data comprising the steps of:
   receiving a composite video
   signal containing alphanumeric character data in a predetermined location;
   decoding on a real time basis the received composite video signal into an analog video component signal representing the lines of a video frame, a horizontal sync component signal, and a vertical sync component signal;

converting to binary data bits, on a real time basis, that portion of the analog video component signal that corresponds to the alphanumeric character data storing the character binary data bits;

comparing the stored binary data bits with stored data representing a known character reference set to determine a character data code; and uniquely identifying the binary character data for use by a computer as desired.

2. The method of claim 1 wherein the step of receiving a signal comprises receiving a signal containing one or more rows of alphanumeric character data.

3. The method of claim 1 wherein the step of converting the analog video component signal comprises converting on a real time basis predetermined lines thereof into a corresponding stream of binary data bits.

4. The method of claim 1 wherein the step of converting the analog video component signal comprises converting each pel of each line thereof into a corresponding line of binary data bits, the binary state of each data bit corresponding to the intensity of each pel of each line of the video signal.

5. The method of claim 4 wherein the step of converting the analog video component signal further comprises reading into successive memory locations the binary data in the same sequence that each line of the analog video component signal is received.

6. The method of claim 1 wherein the step of converting the analog video component signal comprises counting the horizontal sync component signals to identify the predetermined portion of the analog video component signal to be converted to binary data.

7. The method of claim 1 wherein the step of converting the analog video component signal to binary data comprises converting the sequential lines of the video component signal to sequential streams of binary data, and storing each stream of binary data in sequential memory locations corresponding to the line portions of the video component signal.

8. The method of claim 7 wherein the step of storing the binary data bits comprises storing the binary data bits at memory locations defined by the horizontal sync component signal and the vertical sync component signal.

9. The method of claim 1 wherein the step of comparing the binary data with data representing a known character reference set comprises isolating portions of the binary data to define a single character;

counting the number of bits of a first binary state in each row and column of the isolated character data; and comparing the number of counted bits corresponding to the isolated character data to a character data reference set having a known number of bits of a first binary state to uniquely identify the binary character data and its corresponding data code.

10. The method according to claim 1 wherein the step of comparing the binary data with data representing a known character reference set comprises adding together the total number of bits of a first binary state for each of the rows of the stored binary charcter data;

comparing the values of each of the added row totals for the stored binary character data to values of added row totals of a first binary state for a known character data reference set and selecting a predetermined number of the characters of the reference character set that are within a predetermined range of the totals; and comparing each bit of the stored character binary data with the corresponding bit of each of the selected characters of the reference data set and determining which of said reference characters most closely matches the stored character data.

11. The method of claim 10 wherein the step of comparing each bit of the stored character binary data with the corresponding bit of selected characters of the reference set comprises summing the number of mismatches between corresponding bits and determining which of the selected reference set characters contains the minimum number of mismatches to determine the best match.

12. The method of converting alphanumeric video characters according to claim 10 wherein the step of determining the least number of bit mismatches further comprises shifting the data for the stored character one bit to the left of its original stored location and then comparing, and shifting one bit to the right of its original position and then comparing, to minimize errors.

13. A method for communicating information via a conventional analog video signal carrying alphanumeric video characters by converting it into computer recognizable binary data comprising the steps of:

receiving a standard composite video television signal containing alphanumeric character data in a predetermined location;

decoding on a real time basis the received composite video signal into an analog video component signal representing the lines of a video frame, a horizontal sync component signal, and a vertical sync component signal;

converting, on a real time basis, the sequential lines of the analog video component signal corresponding to the predetermined location of the alphanumeric character data to sequential streams of binary data;

storing each stream of binary data in sequential memory locations to form a binary matrix corresponding to the predetermined sequential lines of the video component signal;

comparing the stored binary data with stored data representing a known character reference set to determine the character data code; and uniquely identifying the binary character data for use by a computer as desired.

14. The method of claim 13 wherein the step of converting the analog video component signal comprises counting the horizontal sync component signals to identify the predetermined portion of the analog video component signal to be converted to binary data.

15. The method of claim 13 wherein the step of storing each stream of binary data in sequential memory locations comprises storing the binary data bits at memory locations defined by the horizontal sync component signal and the vertical sync component signal.

16. The method of claim 13 wherein the step of comparing the binary matrix data with data representing a known character reference set comprises isolating portions of the binary data to define a single character;

counting the number of bits of a first binary state in each row of the isolated character data; and comparing the number of counted bits corresponding to the isolated binary character data to a character data reference set having a known number of bits of a first binary state to uniquely identify the binary character data and its corresponding data code.

17. The method according to claim 13 wherein the step of comparing the binary data with data representing a known character reference set comprises adding together the total number of bits of a first binary state for each of the rows of the stored binary character data;

comparing the values of each of the added row totals of bits set to the first binary state for the stored binary character data to values of added row totals of a first binary state for a known character data set and selecting certain ones of the reference character set that are within a predetermined range of the totals; and comparing each bit of the stored character binary data with the corresponding bit of each of the selected characters of the reference data set and determining which of said selected reference characters most closely matches the stored character binary data by summing the number of mismatches between corresponding bits of the data and each of the selected compared reference characters, to determine the best match based upon the minimum number of mismatches.

18. the method of converting alphanumeric video characters according to claim 17 wherein the step of determining the least number of bit mismatches further comprises shifting the data for the stored character matrix one bit to the left of its original stored location and then comparing, and shifting one bit to the right of its original position and then comparing, a minimize errors.

19. Apparatus for communicating information by converting a conventional analog video signal carrying alphanumeric video characters into computer recognizable binary data comprising:

means for receiving a composite video signal containing alphanumeric character data in a predetermined location;

means for decoding on a real time basis the received composite video signal into an analog video component signal representing the lines of a video frame, a horizontal sync component signal, and a vertical sync component signal;

means for converting to binary data bits, on a real time basis, that portion of the analog video component signal corresponding to the alphanumeric character data means for storing the character binary data bits;

means for comparing the binary data bits with stored data representing a known character reference set to determine a character data code; and means for uniquely identifying the binary character data for use by a computer as desired.

20. The apparatus of claim 19 wherein the means for receiving a signal comprises means for receiving a signal containing one or more rows of alphanumeric character data.

21. The apparatus of claim 19 wherein the means for converting the analog video component signal comprises means for converting on a real time basis predetermined lines thereof into a corresponding stream of binary data bits.

22. The apparatus of claim 19 wherein the means for converting the analog video component signal comprises means for converting each pel of each line thereof into a corresponding line of binary data bits, the binary state of each data bit corresponding to the intensity of each pel of each line of the video signal.

23. The apparatus of claim 19 wherein the means for converting the analog video component signal comprises means for reading into successive memory locations the binary data in the same sequence that each line of the analog video component signal is received.

24. The apparatus of claim 19 wherein the means for converting the analog video component signal comprises means for counting the decoded horizontal sync component signals to identify a line portion of the analog video component signal to be converted to binary data.

25. The apparatus of claim 19 wherein the means for converting the analog video component signal to binary data comprises means for converting the sequential lines of the video component signal to sequential streams of binary data, and means for storing each stream of binary data in sequential memory locations corresponding to the sequential line portions of the video component signal.

26. The apparatus of claim 25 wherein the means for storing the binary data bits comprises means for storing the binary data bits at memory locations defined by the horizontal sync component signal and the vertical sync component signal.

27. The apparatus of claim 19 wherein the means for comparing the binary data with data representing a known character reference set comprises means for isolating portions of the binary data to define a single character;

means for counting the number of bits of a first binary state in each row of the isolated character data; and means for comparing the number of counted bits corresponding to the isolated character data to a character data reference set having a known number of bits of a first binary state to uniquely identify the character binary data and a corresponding data code.

28. The apparatus according to claim 19 wherein the means for comparing the binary data with data representing a known character reference set comprises means for adding together the total number of bits of a first binary state for each of the rows of the stored binary character data;

means for comparing the values of each of the added row totals for the stored binary character data to values of added row totals of a first binary state for a known character data set and means for selecting the characters of the reference character set that are within a predetermined range of the totals; and means for comparing each bit of the stored character binary data with the corresponding bit of each of the selected characters of the reference data set and determining which of said reference characters most closely matches the stored character data.

29. The apparatus of claim 28 wherein the means for comparing each bit of the stored character data with the corresponding bit of selected characters of the reference set comprises means for summing the number of mismatches between corresponding bits and means for determining which of the selected reference set characters contains the minimum number of mismatches to determine the best match.

30. The apparatus of converting alphanumeric video characters according to claim 28 wherein the means for determining the least number of bit mismatches further comprises means for shifting the data for the stored character matrix one bit to the left of its original stored location and then comparing, and shifting one bit to the right of its original position and then comparing, to minimize errors.

31. The method according to claim 10 or 17 wherein the step of comparing the values of each of the added row totals for the stored character data to the values of added row totals for a known character data comprises:

determining the absolute value of the difference of the values between each of the row totals for the stored data and the values for the corresponding row totals of each character in the reference set, and then selecting certain characters of the reference set that have the smallest sums of absolute values of their rows.

32. The method according to claim 13 wherein the step of comparing further comprises the step of selecting one of a set of special tests to determine which character in the reference set most closely represents the character to be identified.

* * * * *

UNITED STATES PATENT AND TRADEMARK OFFICE
CERTIFICATE OF CORRECTION

PATENT NO. : 4,811,407

DATED : March 7, 1989

INVENTOR(S) : Blokker, Jr., et al.

It is certified that error appears in the above-identified patent and that said Letters Patent is hereby corrected as shown below:

Column 3, line 5, delete "ofthe" and insert --of the--.
Column 3, lines 61 through 65 delete
"  Referring now to FIG. 2, the analog video signal that contains the alphanumeric characters is typically received by an antenna 5 or is input directly
   into a television if the input is via a closed circuit or master antenna cable system." and insert
-- Referring now to FIG. 2, the analog video signal that contains the alphanumeric characters is typically received by an antenna 5 or is input directly into a television if the input is via a closed circuit or master antenna cable system.--.
Column 6, line 41, delete "be" and insert --by--.
Column 10, line 59, delete "of" and insert --for--.
Column 10, lines 63 through 65 should read as follows:
   --receiving a composite video signal containing
      alphanumeric character data in a predetermined
      location;--.
Column 11, line 6, after "data" insert --;--.
Column 11, lines 36 through 42 should read as follows:
   -- 7. The method of claim 1 wherein the step of converting the analog video component signal to binary data comprises converting the sequential lines of the video component signal to sequential streams of binary data, and storing each stream of binary data in sequential memory locations corresponding to the line portions of the video component signal.--.
Column 12, line 15, after "bits" insert --,--.
Column 13, line 27, delete "the" and insert --The--.
Column 13, line 33, delete "a" and insert --to--.

UNITED STATES PATENT AND TRADEMARK OFFICE
CERTIFICATE OF CORRECTION

PATENT NO. : 4,811,407
DATED : March 7, 1989
INVENTOR(S) : Blokker, Jr. et al

It is certified that error appears in the above-identified patent and that said Letters Patent is hereby corrected as shown below:

Column 13, line 50, after "data" insert --;--.

Signed and Sealed this

Fifth Day of December, 1989

Attest:

JEFFREY M. SAMUELS

Attesting Officer     Acting Commissioner of Patents and Trademarks